Dec. 23, 1952          A. SIMON          2,622,856
APPARATUS FOR TREATING PASTY
MATERIALS, PARTICULARLY
CHOCOLATE PASTES

Filed Sept. 6, 1949                                 2 SHEETS—SHEET 1

Inventor
André Simon

By Clasion Downing Seebld
Attorneys.

Dec. 23, 1952        A. SIMON        2,622,856
APPARATUS FOR TREATING PASTY
MATERIALS, PARTICULARLY
CHOCOLATE PASTES

Filed Sept. 6, 1949        2 SHEETS—SHEET 2

Inventor
André Simon
By _____ Attorneys.

Patented Dec. 23, 1952

2,622,856

UNITED STATES PATENT OFFICE 2,622,856

APPARATUS FOR TREATING PASTY MATERIALS, PARTICULARLY CHOCOLATE PASTES

André Simon, Namur, Belgium

Application September 6, 1949, Serial No. 114,158
In Belgium April 14, 1949

15 Claims. (Cl. 259—102)

The invention concerns apparatus used for treating or working pasty materials or the like, particularly the chocolate pastes, to form therewith intimate mixtures or to render same homogeneous, of the type comprising a tank for the materials and stirrers or the like caused to execute in the tank various movements which may be combined with movements of the tank proper.

It is known that in apparatus of this kind difficulties are experienced to ensure that the materials treated will be intimately mixed in all their parts, that is to say rendered well homogeneous, these materials having, under predetermined conditions of movement, a tendency to take a definite "formation" particularly a formation resembling a stratification into layers without appreciable intermixing of these layers. This is especially true in the case of chocolate pastes, which on the other hand require to be perfectly conditioned and homogenized.

To improve the conditioning and homogenization of pasty materials and particularly of chocolate pastes, it has already been proposed to provide said apparatus, in addition to the aforesaid stirrers, with means adapted to impart to the materials in the tank internal movements in directions other than those along which they are caused to move under the action of the said stirrers. Particularly where these stirrers are in the form of substantially vertical arms rotating about axes which are also substantially vertical, and are caused to move across the tank about a vertical axis thereof, the said means are preferably formed either by separate stirrers or by means of members associated with the existing stirrers and adapted to cause into the mass internal movements which are generally vertical and directed either in upward or downward direction or both.

Where in addition the materials treated are subjected to a thermal conditioning, ensured by circulating a fluid, generally a hot fluid, in a jacket of the tank, the working of the materials is rendered more complex in view of an increase in consistency of the materials located near the side walls and the bottom of the tank and owing to tendency of the materials to stick to these walls and bottom.

In order to remedy at least by part, to this drawback, it has already been proposed to provide these apparatus with scrapers cooperating with the side walls of the tank and tending to return towards the centre of the tank and within the field of action of the stirrers the materials lying near the said side walls. On the other hand in the apparatus of the kind referred to, the circular motion of the stirrer supporting movable harness was effected in one and the same direction exclusively.

In accordance with the invention, to improve the conditioning and homogenization of the pasty materials worked upon in a tank provided with stirrers of the kind specified in the foregoing, or the like, the movable harness is provided with scraping members acting not only on the side walls of the tank but sweeping also the bottom thereof, the scraping members for the side walls and for the bottom cooperating with each other for effectively returning within the field of action of the stirrers the materials having a tendency to remain located near the side walls and the bottom of the tank.

The scraping members acting on the bottom of the tank may be arranged to impart to the materials internal movements in directions other than those resulting in a predetermined formation of the mass, and preferably in a markedly ascending direction, such action replacing or supplementing the action of the separate stirrers or of the members associated to the existing stirrers and referred to in the foregoing.

According to another feature of the invention, the movable harness or the drive thereof, and the said scrapers are so arranged as to enable the direction of movement of the said harness and the direction of action of the said scrapers to be inverted, thereby rendering possible the working of the pasty materials in both directions, and particularly alternatively in one and the other directions, with any desired cadence of inversion, thus accelerating the conditioning and homogenization of the materials.

The scraping members may be single acting members while the working position thereof is changed to reverse their direction of action, but they may also be made as double acting members in such a manner that their direction of action is automatically reversed when changing the direction of movement of the movable harness.

Other features and advantages of the invention will become apparent from the following complementary description of certain preferred embodiments of apparatus for treating or working pasty materials, particularly chocolate pastes, given by way of examples and illustrated more or less diagrammatically by the accompanying drawings, in which.

Figure 1:
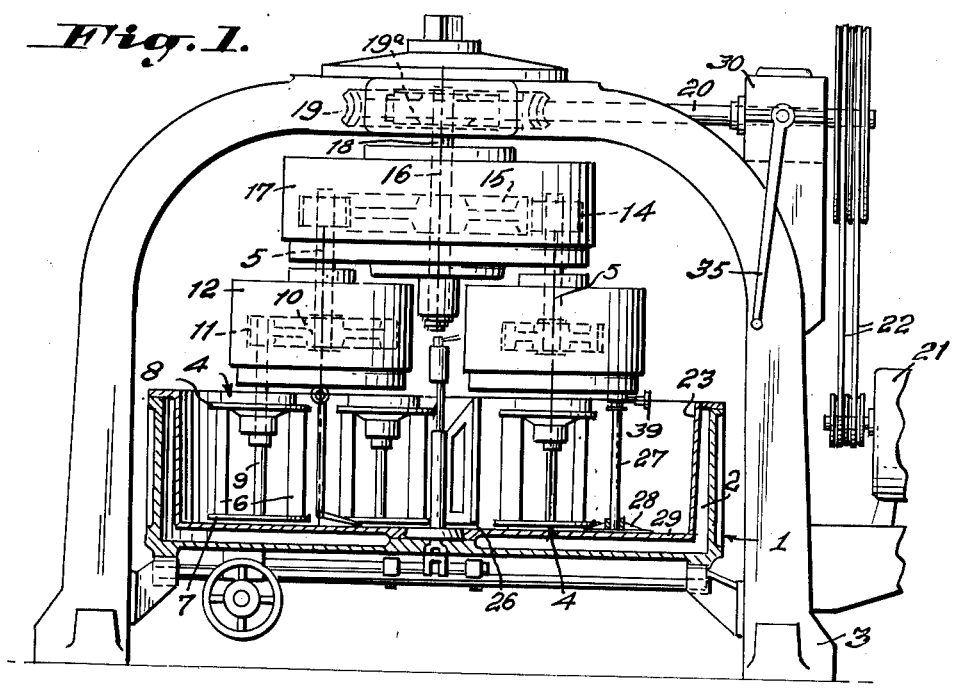
Fig. 1 shows in elevation with part in section an apparatus for treating or working pasty materials, i. e. a chocolate paste, in accordance with the invention.
Figure 2:
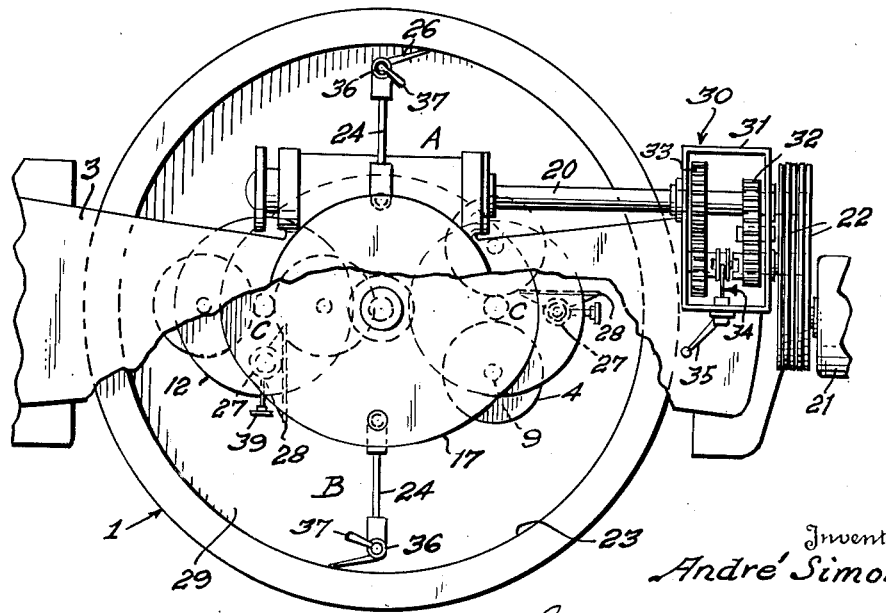
Fig. 2 is a diagrammatical plan view with parts in section of said apparatus.
Figure 3:
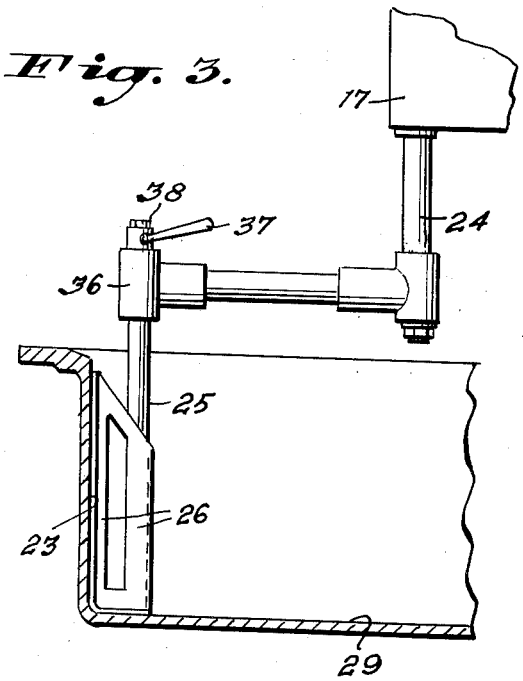
Fig. 3 is a part elevation view of a scraping member for the side walls of the tank.

Referring to the drawings and first to Figs. 1 to 3, 1 designates a double walled tank having a space 2 for circulating a fluid intented to ensure the thermal conditioning of the treated materials, the tank 1 being suitably mounted on a stand 3. Although a stationary tank has been illustrated, it is to be understood that said tank may receive certain movements, as a rotating movement about its central vertical axis. In the tank 1 are mounted stirrers 4, each time arranged by pairs about a common rotational axis 5, each of the stirrers 4 comprising a group of vertical arms 6 and for example three arms 6, arranged between discs 7 and 8 made integral with a central shaft 9. On each of the axes 5 is mounted a toothed wheel 10 and on each of the shafts 9 is mounted a toothed pinion 11, these wheels and pinions being housed within a casing 12 adapted for rotation about its central vertical axis, the arrangement being such that when the casing 12 is rotated, the stirrers 4 are caused to rotate about their shafts 9 and about the axes 5.

The casings 12 are each supported by a vertical shaft indicated at 13, which receives a pinion 14 meshing with a toothed wheel 15 having 16 as axis and which is common to all the said pinions, these wheel and pinions being arranged within a casing 17 adapted to rotate about its vertical axis, which axis is coaxial with the axis of the tank, in such a way that when the casing 17 is rotated the casings 12 are caused to rotate about their shafts and about the vertical axis of the tank.

The casing 17 is supported by a shaft indicated at 18, made integral for rotation with a wormwheel 19 mounted in the stand 3 and receiving its rotating movement from an endless screw 19a made integral with a shaft 20 also mounted in the stand 3 and rotated by means of any suitable drive such as the electrical motor 21 and the belt indicated at 22, while the toothed wheels 10 and 15 are held against rotation, by known means, relative to the casing 17 and the stand 3 respectively.

It will be appreciated that when the motor 21 is operated, the stirrers 4 are rotated about their shafts 9 and about their axes 5, while they are carried across the tank by the rotation of the casing 17.

In operation these stirrers impart to the materials internal movements which however result, as a whole, in a "formation" into more or less horizontal layers, the intimate mixing of which is obtained with difficulty only.

To enable such mixing to be more easily effected and as indicated in the foregoing, within the interspaces A and B (Fig. 2) remaining between the groups of the stirrers 4, other stirrers may be provided, for example stirrers comprising vertical shafts equipped with helices or helix sections and able to impart to the materials of the tank internal movements of ascending or descending or both ascending and descending directions, when these stirrers are carried in rotation by a drive derived from the rotation drive 19—19a in a manner similar to that described in relation with the pinions 14. For simplicity and clearness of the drawings these additional stirrers have not been illustrated.

To avoid that materials should remain localised near the walls and the bottom of the tank, the movable harness is provided with members suitable for scraping these portions of the tank.

Fig. 3 shows the arrangement of a scraper for the wall 23 of the tank—two such scrapers being provided in the illustrated example—and shows particularly that for each such scraper the supporting frame 17 is provided with a square bracket 24 in the outer end of which is engaged a vertical arm 25 supporting the scraper 26 in the form of a more or less flat blade sloping towards the wall 23 and which may be apertured as shown by the drawing. The bottom edge of the scraper 26 may extend to the bottom of the tank and in any case is located very near thereof.

When the casing 17 rotates about the axis 18, the scrapers 26 detach and move away from the wall 23 the materials localised in the vicinity of such wall as well as in the peripherial portion of the bottom and which may have a tendency of sticking thereon, and force these materials towards the centre of the tank and within the field of action of the stirrers 4.

Figs. 1 and 2 show one arrangement of the scrapers cooperating with the bottom of the tank, and particularly that each of the casings 12 supports a vertical arm 27 at the lower end of which is pivotally mounted a scraping blade 28 which is inclined towards the bottom 29 of the tank as from its pivotal connection and rests on this bottom at its external edge. As best seen on Fig. 2, this edge extends widely within the interspace C between two stirrers 4 belonging to the same casing 12.

Meanwhile this edge intersects or even extends past the envelope curve of the paths of said stirrers, in such a way that when the casings 12 are rotated and moved across the tank, the bottom of the tank is swept out by the scrapers 28 to the vicinity of the wall 23. As the materials lying on the bottom 29 at the periphery thereof are returned towards the centre through the scrapers 26, by the association of the scrapers 26 and 28 there is obtained that all the materials having a tendency to become localised and it may be to stick to the bottom 29 and the wall 23, are dislodged and reintroduced into the mass.

Moreover, owing to their construction and arrangement, the scrapers 28 impart, in the first place to the materials on which they are acting directly and then step by step to the other materials of the tank, internal movements in a markedly ascending direction with as a result the tendency to destroy the "formation" in superimposed layers referred to in the foregoing.

In this way they may replace the additional stirrers imparting to the mass internal movements in the ascending direction or, where such additional stirrers are provided, they reinforce the action in the ascending direction of these stirrers on the materials of the tank.

In the example, a single scraper 28 has been provided in one of the interspaces such as C between the stirrers 4, but it will be appreciated that such a scraper could be mounted in each of these interspaces.

Till now, apparatus of the kind described have been operated by moving the movable harness i. e., casing 17, casings 12 and stirrers 4, in one direction only. Contrary to this usual method of operation, and in accordance with the invention, the aforesaid movable harness is driven alternatively in one and then in the other direction, with the result that the trituration of the mass of the material is improved and the duration of the homogenization is reduced, or for the same duration of the treatment, a higher degree of homogenization is attained, something which is of particular importance when chocolate pastes are concerned.

This favourable result seems to be due to the fact that more or less violent eddies are taking place in the mass each time the direction of movement is reversed, while, assuming a certain "formation" of the mass is taking place in one direction of movement, this "formation" will not be necessary the same and most frequently will be different in the other direction, thus resulting in an intermixing of the different parts of the mass.

In the exemplative embodiment illustrated the possibility of working alternatively in one direction and then the other is ensured by suitably arranging the driving mechanism, preferably by providing the driving shaft 20 with a reversing device 30.

Any suitable kind of reversing device may be used. With advantage the device comprises, as shown in Fig. 2, a box 31 including a set 32 of three toothed wheels in permanent mesh and a set 33 of two permanently meshing toothed wheels, the toothed wheels on the driven shaft 20 being each constructed as a free wheel and a clutch 34 being inserted between the shafts of the driving toothed wheels. The clutch is operated from outside the box by means of an operating lever 35.

For the same purpose, the scrapers 26 and 28 are mounted so that their position may be changed, i. e. their direction of action reversed.

To this end, as regard each of the scrapers 26, the arm 25 supporting the scraper is mounted to rotate in the end 36 of the square bracket 24, a handle 37 as well as any suitable clamping member, such as the nut 38 engaged on a threaded portion formed at the end of the arm 25, being provided to secure the scraper 26 in one or the other of its operating positions.

As regards each of the scrapers 28, the supporting arm 27 thereof is arranged to rotate about its axis within the housing provided for the said arm in the corresponding casing 12, and a suitable clamping member, such as the set screw 39, is provided to secure the scraper in the desired operating position.

Figure 4:
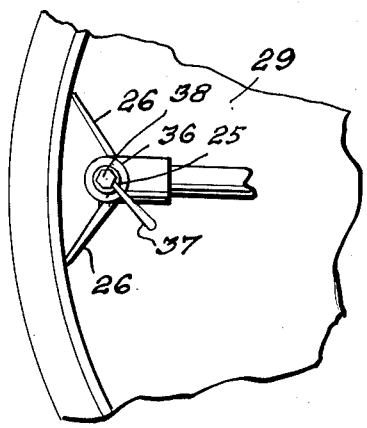
Fig. 4 is a part top plan view of a double acting scraper for the side walls of the tank.
Figure 5:
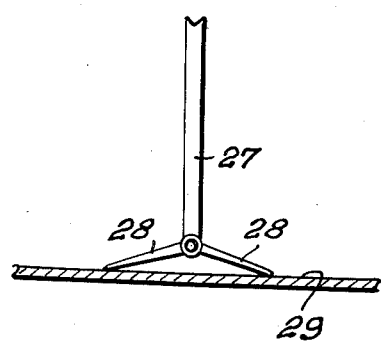
Fig. 5 is a part side elevation view of a double acting scraper for the bottom of the tank.

Instead of being able to be adjusted angularly in various directions, the scrapers 26 and 28 may be constructed as double acting scrapers, and this construction has been illustrated in the Figs. 4 and 5.

Fig. 4 shows a scraper 26 as formed with two identical blades, both sloping towards the wall 23 but in opposite directions, one of them being effective for scraping the said wall in one direction of movement of the movable harness— casings 17 and 12 and stirrers 4.

Fig. 5 shows a scraper 28 as formed with two identical blades both sloping towards the bottom 29 of the tank but in opposite directions, one of them being effective for scraping the bottom in one direction of movement of the movable harness—casings 17 and 12 and stirrers 4.

In this way in order to change the direction of operation, it will be sufficient to modify the position of the clutch operating lever 35.

Although certain embodiments only have been described, it is to be understood that the invention is not so limited, but includes the modifications and the alternatives as well as the equivalent constructions.

I claim:

1. Apparatus for treating pasty materials, particularly chocolate pastes, including a tank having a bottom wall and upstanding side walls, a supporting frame, a casing supported on said frame for rotation about a vertical axis of the tank and means to rotate said casing about said vertical axis, a stirrer assembly rotatably supported on said casing, said stirrer assembly including a casing rotatably supported in and out of centre position on the first named casing, stirring means rotatably supported in an out of centre position on the second named casing and means to rotate the said second casing and stirring means respectively, scraping members supported on the first named casing, and moved thereby circularly in the tank for scraping the side walls of the tank, and cooperative scraping members supported on the stirrer assembly and moved thereby along paths closed about points lying between the side walls and the centre of the tank for scraping the bottom wall of the tank, whereby the materials in the tank tending to become localized near the side and bottom walls of the tank are dislodged from their locations and caused to enter the field of action of the said stirring means.

2. Apparatus for treating pasty materials, particularly chocolate pastes, including a tank having a bottom wall and upstanding side walls, a supporting frame, a casing supported on said frame for rotation about a vertical axis of the tank and means to rotate said casing about said vertical axis, a second casing mounted for rotation on the first named casing about an axis in spaced relation to the said vertical axis of the tank, and means to rotate said second casing about the said spaced axis, stirring means rotatably mounted in an out of centre position on the said second casing and means to rotate said stirring means, scraping members supported on the first named casing and moved thereby circularly in the tank for scraping the side walls of the tank, and cooperative scraping members associated with said second casing and moved therewith for scraping the bottom wall of the tank, whereby the materials tending to become localized near the side and bottom walls of the tank are dislodged from their locations and caused to enter the field of action of the said stirring means.

3. Apparatus for treating pasty materials, particularly chocolate pastes, including a tank having a bottom wall and upstanding side walls, a supporting frame, a casing mounted on said frame for rotation about a vertical axis of the tank and means to rotate said casing about said vertical axis, a second casing mounted for rotation on the first named casing about an axis arranged in spaced relation to the said vertical axis of the tank and means to rotate said second casing about said spaced axis, movable stirrers, each mounted on the said second casing for rotation about an axis eccentric to the rotation axis of said second casing and means to rotate each said stirrers about its own axis of rotation, scraping members supported on the first named casing and moved thereby circularly in the tank for scraping the side walls of the tank, and cooperative scraping members associated with said second casing and moved therewith about the rotation axis of said second casing for scraping the bottom wall of the tank, whereby the materials tending to become localized near the side and bottom walls of the tank are dislodged from their locations and caused to enter the field of action of the stirrers.

4. Apparatus for treating pasty materials, particularly chocolate pastes, including a tank having a bottom wall and upstanding side walls, a supporting frame, a casing mounted on said frame for rotation about the central vertical axis of the tank and means to rotate said casing about said vertical axis, a second casing mounted for rotation on the first named casing about an axis spaced from and parallel to the said central vertical axis and means to rotate said second casing about the said spaced axis, stirring means rotatably mounted in parallel spaced relation to the rotation axis of the said second casing and means to rotate said stirring means, scraping members supported on the first named casing and moved thereby circularly in the tank for scraping the side walls of the tank, and cooperative scraping members supported on said second casing and moved bodily therewith for scraping the bottom wall of the tank, whereby the materials tending to become localized near the side and bottom walls of the tank are dislodged from their locations and caused to enter the field of action of the said stirring means.

5. Apparatus for treating pasty materials, particularly chocolate pastes, including a tank having a bottom wall and upstanding side walls, a supporting frame, a casing mounted on said frame for rotation about a vertical axis of the tank and means to rotate said casing about said vertical axis, a stirrer assembly rotatably supported on said casing, said stirrer assembly including a casing rotatably supported in an out of centre position on the first named casing, stirring means including arms arranged in parallel spaced relation around a parallel common axis, rotatably supported in an out of centre position on the second named casing, and means to rotate said second casing and stirring means respectively, scraping members supported on the first named casing and moved thereby circularly in the tank, and cooperative scraping members supported on the stirrer assembly and moved thereby along paths closed about points lying between the side walls and the centre of the tank for scraping the bottom wall of the tank, whereby the materials in the tank tending to become localized near the side and bottom walls of the tank are dislodged from their locations and caused to enter the field of action of the said stirring means.

6. Apparatus for treating pasty materials, particularly chocolate pastes, including a tank having a bottom wall and upstanding side walls, a supporting frame, a casing mounted on said frame for rotation about the central vertical axis of the tank and means to rotate said casing about said vertical axis, a stirrer assembly rotatably supported on said casing, said stirrer assembly including a casing rotatably supported in an out of centre position on the first named casing, stirring means rotatably supported in an out of centre position on the second named casing, and means to rotate said second casing and stirring means respectively, scraping members supported on the first named casing and scraping members supported on the stirrer assembly for cooperation with the side walls and bottom wall of the tank respectively, and moved by said first named casing and stirrer assembly on overlapping paths extending circularly to the tank and closed about points lying between the side walls and the centre of the tank, respectively, whereby the materials in the tank tending to become localized near the side and bottom walls of the tank are dislodged from their locations and caused to enter the field of action of the said stirring means.

7. Apparatus for treating pasty materials, particularly chocolate pastes, including a tank having a bottom wall and upstanding side walls, a supporting frame, a casing mounted on said frame for rotation about the central vertical axis of the tank and means to rotate said casing about said vertical axis, a second casing mounted for rotation on the first named casing about an axis spaced from and parallel to the said centre vertical axis and means to rotate said second casing about said spaced axis, stirring means rotatably mounted on the said second casing in parallel spaced relation to the rotation axis of said second casing and means to rotate said stirring means, scraping members supported on the first and second named casings respectively for cooperation with the side walls and the bottom walls of the tank respectively, and moved by the said first and second named casing on overlapping paths concentric to the tank and concentric to vertical axes of the tank lying between the side walls and the centre of the tank, respectively, whereby the materials in the tank tending to become localized near the side and bottom walls of the tank are dislodged from their locations and caused to enter the field of action of the said stirring means.

8. Apparatus for treating pasty materials, particularly chocolate pastes, including a tank having a bottom wall and upstanding side walls, a supporting frame, a casing mounted on said frame for rotation about a vertical axis of the tank and means to rotate said casing about said vertical axis, a second casing mounted for rotation on the first named casing about an axis spaced from and parallel to the said vertical axis and means to rotate said second casing about said spaced axis, several stirrers rotatably mounted in spaced relation on the said second casing around the rotation axis thereof and means to rotate the stirrers, scraping members supported on the first named casing and moved thereby circularly to the tank for scraping the side walls of the tank, and scraping members supported by the second named casing within the interspaces between the stirrers thereon and extending outwardly past the envelop curve of said stirrers for scraping the bottom wall of the tank.

9. Apparatus for treating pasty materials, particularly chocolate pastes, including a tank having a bottom wall and upstanding side walls, a supporting frame, a casing supported on said frame for rotation about a vertical axis of the tank and means to rotate said casing about said vertical axis, a stirrer assembly rotatably supported on said casing, said stirrer assembly including a casing rotatably supported in an out of centre position on the first named casing, stirring means rotatably supported in an out of centre position on the second named casing and means to rotate said second named casing and stirring means respectively, scraping members supported on the first named casing and moved thereby circularly in the tank for scraping the side walls of the tank, and cooperative scraping members having surfaces sloping towards the wall to be scraped supported by said stirrer assembly and moved thereby on paths closed about points lying between the side walls and the centre of the tank for scraping the bottom wall of the tank, whereby the materials in the tank tending to become localized near the side and bottom walls thereof are dislodged from their locations and internal movements of generally ascending direction are imparted to the materials in the tank by the scraping members acting on the bottom wall thereof.

10. Apparatus for treating pasty materials, particularly chocolate pastes, including a tank having a bottom wall and upstanding side walls, a supporting frame, a casing supported on said frame for rotation about the vertical axis of the tank and means to rotate said casing, a second casing supported on the first named casing for rotation about an axis spaced from and parallel to the said vertical axis of the tank and means to rotate the second named casing, stirrers, each supported on the second named casing for rotation about an axis spaced from and parallel to the axis of rotation of the second named casing and means to rotate said stirrers, scraping members supported on the first named casing with their operating surface sloping towards the wall to be scraped for scraping the side walls of the tank and scraping members supported on said second named casing with their operating surface sloping towards the wall to be scraped for scraping the bottom wall of the tank.

11. Apparatus for treating pasty materials, particularly chocolate pastes, including a tank having a bottom wall and upstanding side walls, a supporting frame, a casing supported on said frame for rotation about the vertical axis of the tank, and means to rotate said casing about said vertical axis in either direction of rotation, a second casing supported on the first named casing for rotation about an axis spaced from and parallel to the said vertical axis of the tank and means to rotate the second named casing, stirrers, each supported on the second named casing for rotation about an axis spaced from and parallel to the axis of rotation of the second named casing and means to rotate said stirrers, scraping members having their operating surface sloping towards the wall to be scraped and supported by the first and second named casings, substantially vertical shafts each rotatable about its own axis for supporting said scraping members and place the scrapers in different angularly spaced operating positions, means to secure each of the last named vertical shafts in a desired operating position, and means for changing the direction of rotation of the first named casing.

12. Apparatus for treating pasty materials particularly chocolate pastes, including a tank having a bottom wall and upstanding side walls, a supporting frame, a casing supported on said frame for rotation about the vertical axis of the tank and means to rotate said casing about said vertical axis in either direction of rotation, a second casing supported on the first named casing for rotation about an axis spaced from and parallel to the said vertical axis of the tank and means to rotate said second named casing, stirrers, each supported on the second named casing for rotation about an axis spaced from and parallel to the axis of rotation of the second named casing and means to rotate said stirrers, scraping members for the side and bottom walls respectively, and said scraping members supported on the first and second named casings respectively, each scraping member operating surfaces sloping in opposite directions towards the wall to be scraped from an inner point at a distance of said last named wall, and means for changing the direction of rotation of the first named casing.

13. Apparatus for treating pasty materials, particularly chocolate pastes, including a tank having a bottom wall and upstanding side walls, a supporting frame, a casing supported on said frame for rotation about the vertical axis of the tank and means to rotate said casing about said vertical axis in either direction of rotation, a second casing supported by the first named casing for rotation about an axis spaced from and parallel to the said vertical axis of the tank and means to rotate said second named casing, stirrers, each including a group of spaced vertical arms on a mount and a substantially vertical and rotatable shaft common to the arms and the mount of the group, each stirrer supported on the second named casing for rotation about the said substantially vertical common shaft, and means to rotate said stirrers, scraping members having their operating surface sloping toward the wall to be scraped and supported by the first and second named casings, substantially vertical shafts each rotatable about its own axis for supporting said scraping members and place the scrapers in different operating angularly spaced positions, means to secure each of the last named vertical shafts in a desired operating position and means for changing the direction of rotation of the first named casing.

14. Apparatus for treating pasty materials, particularly chocolate pastes, including a tank having a bottom wall and upstanding side walls, a supporting frame, a casing supported on said frame for rotation about the vertical axis of the tank and means to rotate said casing about said vertical axis in either direction of rotation, a second casing supported by the first named casing for rotation about an axis spaced from and parallel to the said vertical axis of the tank and means to rotate said casing, stirrers, each including a group of spaced vertical arms on a mount and a substantially vertical and rotatable shaft common to the arms and the mount of the group, each stirrer supported on the second named casing for rotation about the said substantially vertical common shaft, and means to rotate said stirrers, scraping members for the side and bottom walls respectively and said scraping members supported on the first and second named casings respectively, each scraping member having operating surfaces sloping in opposite directions towards the wall to be scraped from an inner point at a distance of said last named wall, and means for reversing the direction of rotation of the first named casing.

15. Apparatus for treating pasty materials, particularly chocolate pastes, including a tank having a bottom wall and upstanding side walls, a supporting frame, a casing mounted on said frame for rotation about a vertical axis of the tank and means to rotate said casing about said vertical axis, a second casing mounted for rotation on the first named casing about an axis spaced from and parallel to the said vertical axis, and means to rotate said second casing about said spaced axis, several stirrers rotatably mounted in spaced relation on the said second casing around the rotation axis thereof and means to rotate the stirrers, scraping members supported on the first named casing and moved thereby circularly to the tank for scraping the side walls of the tank, and scraping members supported by the second named casing within the interspaces between the stirrers thereon and widely extending inwardly between said stirrers for scraping the bottom wall of the tank.

ANDRÉ SIMON.

REFERENCES CITED

The following references are of record in the file of this patent:

UNITED STATES PATENTS

| Number | Name | Date |
|---|---|---|
| 1,369,053 | Scott | Feb. 22, 1921 |
| 2,237,957 | Christensen et al. | Apr. 8, 1941 |

FOREIGN PATENTS

| Number | Country | Date |
|---|---|---|
| 163,666 | Great Britain | Mar. 16, 1922 |
| 665,424 | Germany | Sept. 24, 1938 |